US012742510B1

(12) United States Patent
Golan et al.

(10) Patent No.: US 12,742,510 B1
(45) Date of Patent: Sep. 22, 2026

(54) RETAINING DEVICE FOR END RINGS OF PIPE COUPLING

(71) Applicant: Krausz Industries Ltd., Rosh HaAyin (IL)

(72) Inventors: Liron Golan, Kfar Sava (IL); Sergey Ryvzh, Rishon LeZion (IL)

(73) Assignee: Krausz Industries Ltd., Rosh HaAyin (IL)

( * ) Notice: Subject to any disclaimer, the term of this patent is extended or adjusted under 35 U.S.C. 154(b) by 0 days.

(21) Appl. No.: 19/188,215

(22) Filed: Apr. 24, 2025

(51) Int. Cl.
*F16L 23/08* (2006.01)
*F16L 21/06* (2006.01)

(52) U.S. Cl.
CPC ............. *F16L 23/08* (2013.01); *F16L 21/065* (2013.01)

(58) Field of Classification Search
CPC .......... F16L 23/08; F16L 21/065; F16L 21/08
See application file for complete search history.

(56) References Cited

U.S. PATENT DOCUMENTS 3,836,184 A * 9/1974 Gregory .................. F16L 21/06 285/39
3,981,091 A 9/1976 Wiener, Jr.
4,708,377 A * 11/1987 Hunting .................. F16L 23/04 285/407
8,454,056 B2 * 6/2013 Fernandes ............... F16L 23/10 285/82
10,563,799 B2 * 2/2020 Prevot ................. F01N 13/1805
11,746,938 B2 * 9/2023 Cottle ..................... F16L 23/08 285/367
2017/0059070 A1 3/2017 Chiproot
2021/0018124 A1 1/2021 Drivon et al.
2021/0148498 A1 * 5/2021 Jacquelin .............. F16L 23/003
2022/0381382 A1 12/2022 Blanchet
2023/0160517 A1 5/2023 Piontek et al.

FOREIGN PATENT DOCUMENTS

| | | |
|---|---|---|
| FR | 729345 | 7/1932 |
| GB | 1536121 | 12/1978 |
| WO | 2018/186811 | 10/2018 |
| WO | 2018/217993 | 11/2018 |

* cited by examiner

*Primary Examiner* — James M Hewitt, II
(74) *Attorney, Agent, or Firm* — PEARL COHEN LLP

(57) ABSTRACT

A pipe coupling includes a body, a center ring at each end of the body, and an end ring coupled to the center ring by means of an annular rim located at an axially-inner end of the end ring. The annular rim extends radially outwards to form an annular hollow portion that fits over and is coupled to the center ring. A retaining device is positioned to snugly press against the annular rim so as to press the end ring and the annular rim against the center ring, thereby maintaining the end ring and the annular rim in a position which is concentric with the center ring and the body of the pipe coupling.

4 Claims, 4 Drawing Sheets

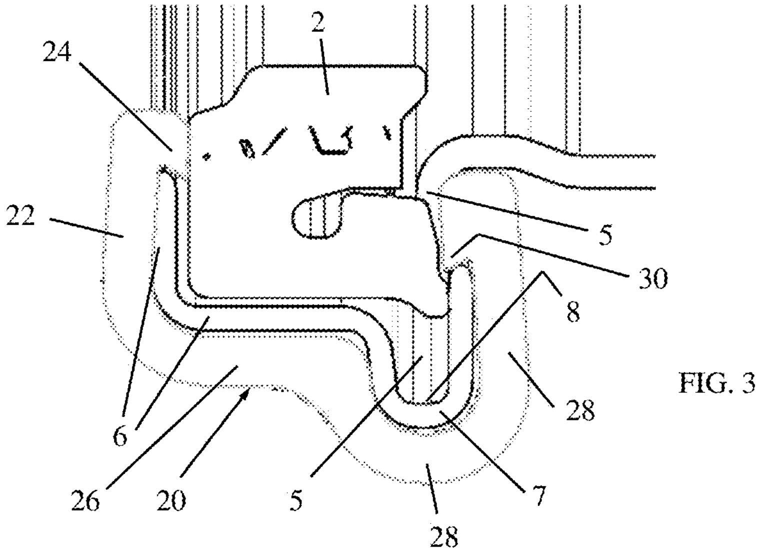
FIG. 3
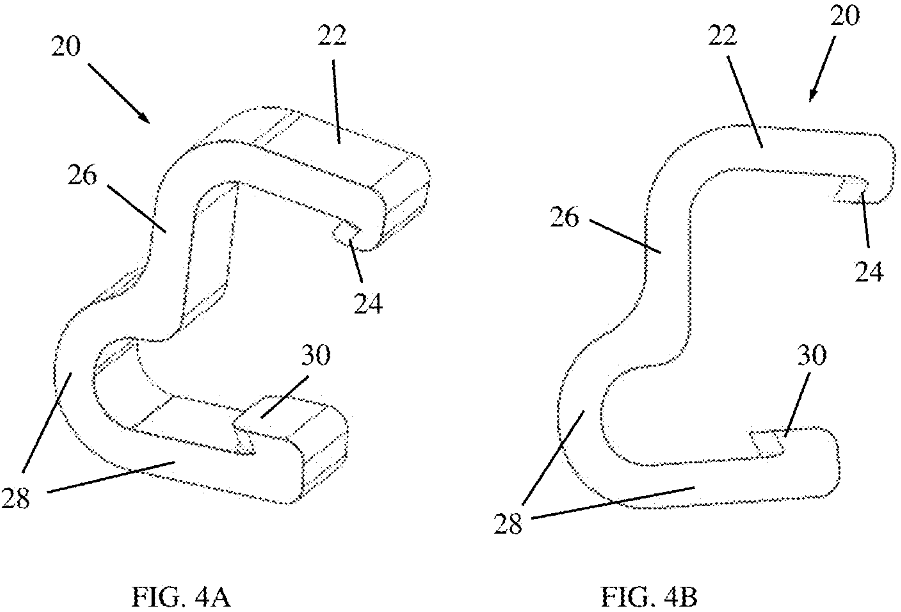
FIG. 4A
FIG. 4B

RETAINING DEVICE FOR END RINGS OF PIPE COUPLING

FIELD OF THE INVENTION

The present invention relates generally to pipe couplings, and particularly to a pipe coupling with a retaining device that prevents misalignment or dislodgement of end rings of the pipe coupling during handling and shipping.

BACKGROUND OF THE INVENTION

Many kinds of removable couplings for pipes exist in the art. It is noted that throughout the specification and claims, the term "pipe" encompasses any kind of generally cylindrical object.

One popular and successful pipe coupling is the HYMAX brand of pipe couplings, an example of which is shown in FIG. 1 as pipe coupling 1, or for short, coupling 1.

Coupling 1 is a wide-range coupling provided with an elastomeric seal member 2, also called a flip gasket 2. The flip gasket 2, when in the folded configuration, can seal against a smaller diameter pipe; when flip gasket 2 is flipped outwards to a non-folded configuration, it can seal against a larger diameter pipe.

Coupling 1 includes a body 4, which is typically but not necessarily cylindrical in shape. At each end of body 4 there is a center ring 5. An end ring 6 is coupled to the center ring 5 by means of an annular rim 7 located at an axially-inner end of end ring 6. The annular rim 7 extends radially outwards to form an annular hollow portion 8 that fits over and is coupled to the center ring 5. Each elastomeric seal member 2 is housed inside each end ring 6. Each end ring 6 includes two fastening ears 9 which receive a single fastener 3 (e.g., bolt and nut or other tightenable screw), which when tightened in a direction transverse to the axial length of the pipe, presses the elastomeric seal member 2 against the surface of the pipe.

A bridge element 10 may extend over and cover the circumferential gap between the fastening ears 9. Coupling 1 may include a lifting handle 11, such as a T-handle.

Sometimes during handling and shipping, the coupling 1 may sustain blows that can cause any one of the end rings 6 to become misaligned and/or decentered with respect to the center ring 5 and/or the body 4. A heavy blow may even cause the end ring 6 to become dislodged from the coupling. Accordingly, there is a need for preventing misalignment or dislodgement of the end rings.

SUMMARY

The present invention seeks to provide user-friendly retaining device that prevents misalignment or dislodgement of end rings of a pipe coupling during handling and shipping, as is described more in detail hereinbelow.

There is thus provided in accordance with a non-limiting embodiment of the invention, for use with a pipe coupling that includes a body, a center ring at each end of the body, and an end ring coupled to the center ring by means of an annular rim located at an axially-inner end of the end ring, the annular rim extending radially outwards to form an annular hollow portion that fits over and is coupled to the center ring, an accessory including a retaining device positioned to snugly press against the annular rim so as to press the end ring and the annular rim against the center ring, thereby maintaining the end ring and the annular rim in a position which is concentric with the center ring and the body of the pipe coupling.

In accordance with a non-limiting embodiment of the invention the retaining device is positioned to press against outer surfaces of the end ring and the annular rim.

In accordance with a non-limiting embodiment of the invention the retaining device includes a first end ring pressing portion that terminates in a first catch shaped to snugly snap over an edge of the end ring, a second end ring pressing portion that extends from the first end ring pressing portion, and an annular rim pressing portion that extends from the second end ring pressing portion and which is shaped to fit over and press against the annular rim, the annular rim pressing portion terminating in a second catch which is shaped to snugly snap over an edge of the annular rim.

In accordance with a non-limiting embodiment of the invention the retaining device is positioned to press against an inner surface of the annular rim.

In accordance with a non-limiting embodiment of the invention the retaining device includes a resilient wire shaped to fit in the annular hollow portion and press against the annular rim.

In accordance with a non-limiting embodiment of the invention the resilient wire extends through the annular hollow portion so that two opposite ends of the resilient wire meet each other 180° from a top portion of the retaining device.

In accordance with a non-limiting embodiment of the invention the top portion of the retaining device bulges radially outwards.

There is also provided in accordance with a non-limiting embodiment of the invention a pipe coupling that includes any of the retaining devices described herein.

BRIEF DESCRIPTION OF DRAWINGS

The present invention will be understood and appreciated more fully from the following detailed description, taken in conjunction with the drawings in which:

FIG. 3 is an enlarged view of the retaining device of FIG. 2 coupled to the end ring and center ring of the pipe coupling.

FIGS. 4A and 4B are perspective and side-view illustrations, respectively, of the retaining device of FIG. 2.

DETAILED DESCRIPTION

Figure 1:
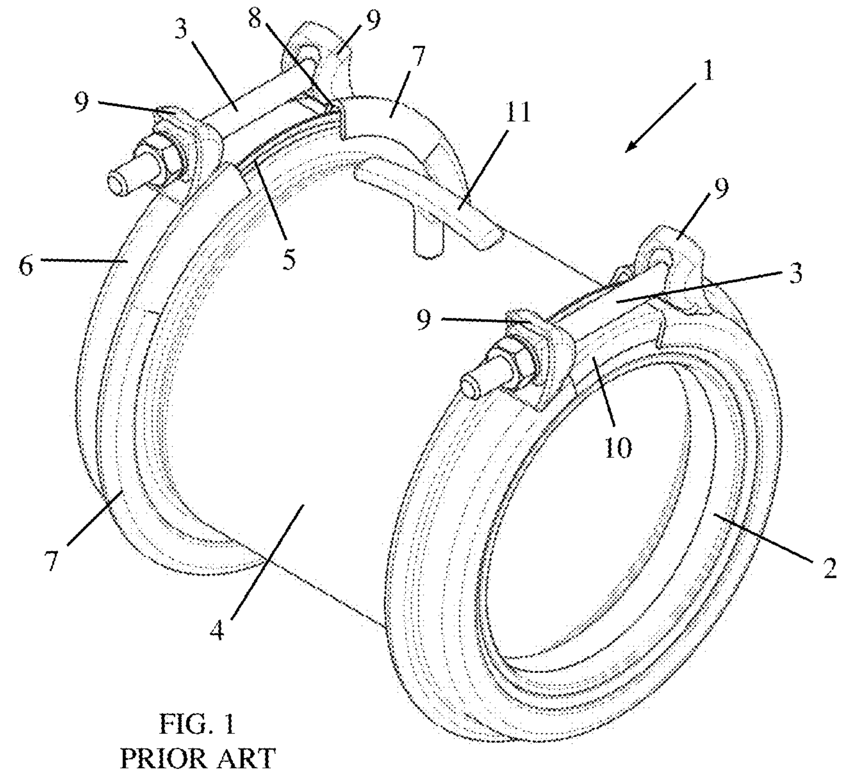
FIG. 1 is a simplified perspective illustration of a prior art pipe coupling.
Figure 2:
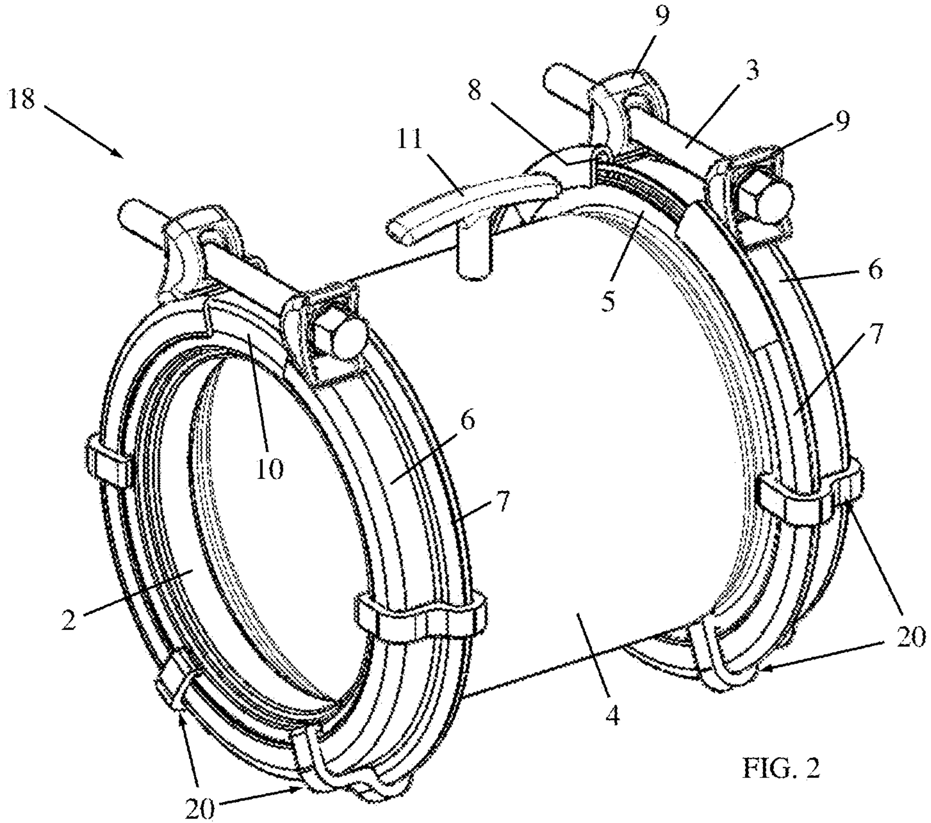
FIG. 2 is a simplified perspective illustration of a pipe coupling that has retaining devices for end rings of the pipe coupling, in accordance with a non-limiting embodiment of the present invention.

Reference is now made to FIG. 2, which illustrates a pipe coupling 18 that has one or more retaining devices 20 for end rings of the pipe coupling, in accordance with a non-limiting embodiment of the present invention. In the illustrated embodiment, pipe coupling 18 is constructed like pipe coupling 1 of FIG. 1, with like elements being designated by like reference numbers, but the invention is not limited to this configuration of a pipe coupling and is applicable for any kind of pipe coupling that has an end ring or similar member which must be retained in place during handling and shipping.

The retaining device 20 snugly fits over the end ring 6 and annular rim 7 and presses them against the center ring 5 of coupling 18. This will be seen in greater detail in FIG. 3, is as now explained.

Referring to FIG. 3, it is seen that retaining device 20 includes a first end ring pressing portion 22 that terminates in a first catch 24 which is cantilever snap joint or torsion snap joint shaped to snugly snap over an edge of the end ring 6. A second end ring pressing portion 26 extends (e.g., perpendicularly) from the first end ring pressing portion 22. An annular rim pressing portion 28 extends from the second end ring pressing portion 26 and is shaped to fit over and press against annular rim 7. The annular rim pressing portion 28 terminates in a second catch 30 which is shaped to snugly snap over an edge of the annular rim 7.

FIGS. 4A and 4B are perspective and side-view illustrations, respectively, of the retaining device 20. It is noted that retaining device 20 may be made of an injection molded plastic (such as but not limited to, nylon (polyamide), polycarbonate, polypropylene, ABS (acrylonitrile butadiene styrene)), or metal or any other suitable material that is resilient, yet stiff and durable without having fatigue stress, to snugly snap over the end ring and annular rim and maintain them in place with proper concentricity with respect to the rest of the coupling.

In usage, as seen in FIGS. 2 and 3, one or more retaining devices 20 are snugly pressed over end ring 6 and annular rim 7 and press them against center ring 5, thereby maintaining end ring 6 and annular rim 7 in their correct position which is concentric with center ring 5 and the body of the coupling. The retaining devices 20 are removed from the coupling before the coupling is installed in place.

Figure 5:
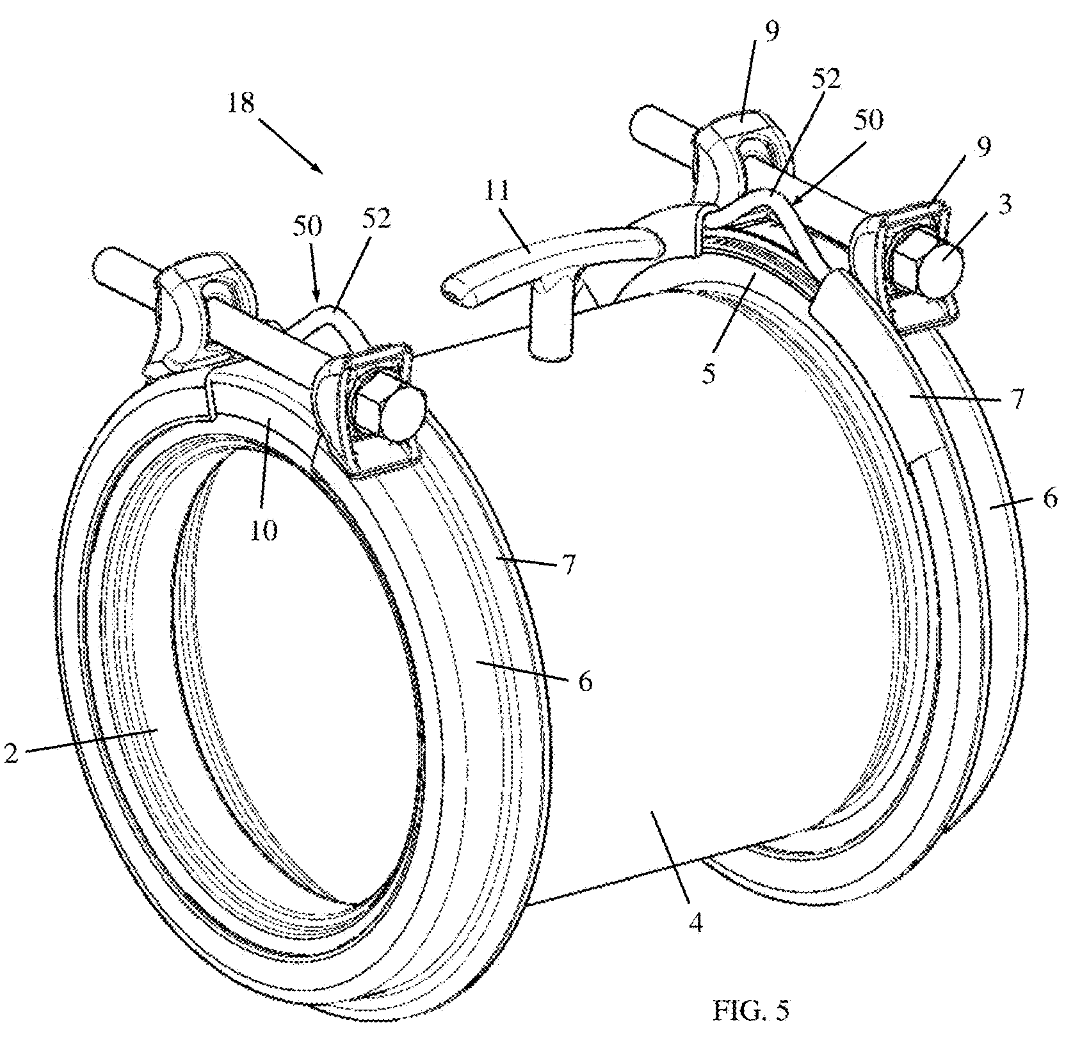
FIG. 5 is a simplified perspective illustration of a pipe coupling that has retaining devices for end rings of the pipe coupling, in accordance with another non-limiting embodiment of the present invention.
Figure 5A:
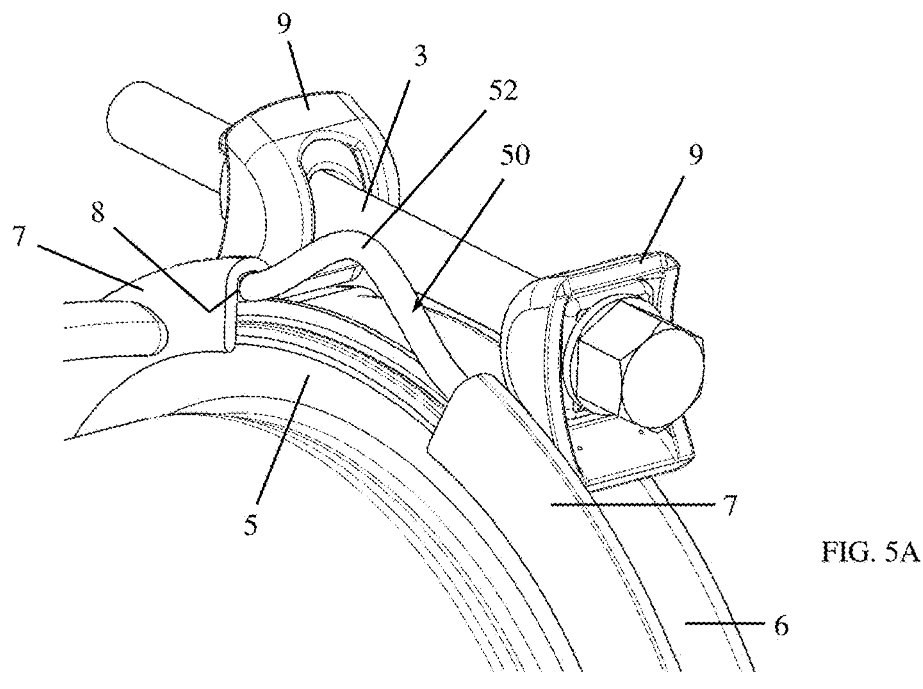
FIG. 5A is an enlarged view of the retaining device of FIG. 5 coupled to the end ring and center ring of the pipe coupling.

Reference is now made to FIG. 5, which illustrates pipe coupling 18 that has one or more retaining devices 50 for end rings 6 of the pipe coupling, in accordance with another non-limiting embodiment of the present invention.

Figure 5B:
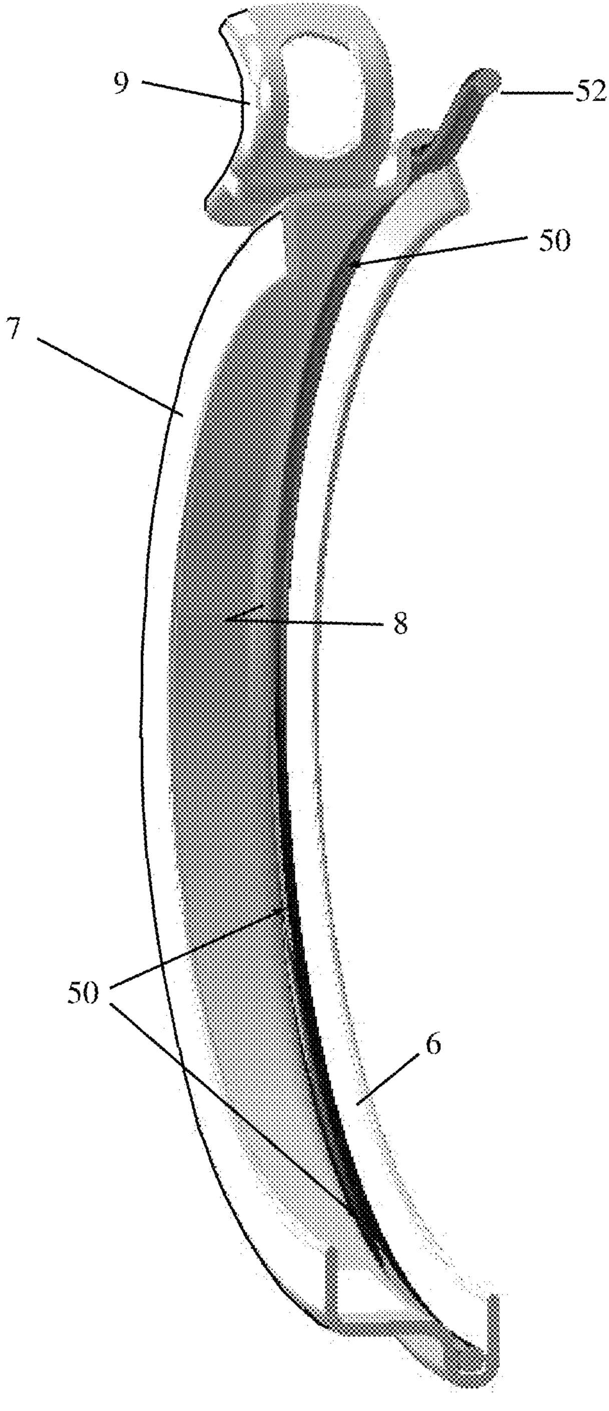
FIG. 5B is a cutaway view of the retaining device of FIG. 5 received in an annular rim of the end ring.

In this embodiment, retaining device 50 includes a resilient wire (with a circular cross section or other cross sectional shapes) shaped to fit in annular hollow portion 8 and press against annular rim 7, thereby pressing annular rim 7 against center ring 5 and maintaining end ring 6 and annular rim 7 in their correct position which is concentric with center ring 5 and the body of the coupling. The retaining device 50 may be made of a spring steel alloy or other material with suitable spring constant and strength. As seen best in FIG. 5B, retaining device 50 extends all the way through annular hollow portion 8 so that the two opposite ends of the wire meet each other 180° from the top portion 52 of the wire which is typically aligned with the center of the fastener 3. The top portion 52 of the wire may bulge radially outwards which provides a visual reminder to the user to remove retaining device 50 before using the coupling.

In summary, both retaining devices 20 and 50 snugly press against annular rim 7 to press end ring 6 and its annular rim 7 against center ring 5, thereby maintaining end ring 6 and annular rim 7 in their correct position which is concentric with center ring 5 and the body of the coupling. The retaining devices 20 and 50 differ regarding against which part of annular rim 7 they press. Retaining device 20 presses against the outer surfaces of end ring 6 and annular rim 7. Retaining device 50 presses against the inner surface of annular rim 7.

The invention claimed is:

1. A pipe coupling comprising:

a body, a center ring at each end of said body, and an end ring coupled to the center ring by means of an annular rim located at an axially-inner end of said end ring, said annular rim extending radially outwards to form an annular hollow portion that fits over and is coupled to said center ring; and a retaining device positioned to snugly press against said annular rim so as to press said end ring and said annular rim against said center ring, thereby maintaining said end ring and said annular rim in a position which is concentric with said center ring and said body of said pipe coupling;

wherein said retaining device is positioned to press against an inner surface of said annular rim;

wherein said retaining device comprises a resilient wire shaped to fit in said annular hollow portion and press against said annular rim; and wherein said resilient wire extends through said annular hollow portion so that two opposite ends of said resilient wire meet each other 180° from a top portion of said retaining device.

2. The pipe coupling according to claim 1, wherein said retaining device is further configured to press against outer surfaces of said end ring and said annular rim.

3. The pipe coupling according to claim 2, wherein said retaining device further comprises a first end ring pressing portion that terminates in a first catch shaped to snugly snap over an edge of said end ring, a second end ring pressing portion that extends from said first end ring pressing portion, and an annular rim pressing portion that extends from said second end ring pressing portion and which is shaped to fit over and press against said annular rim, said annular rim pressing portion terminating in a second catch which is shaped to snugly snap over an edge of said annular rim.

4. The pipe coupling according to claim 1, wherein said top portion of said retaining device bulges radially outwards.

* * * * *